United States Patent [19]
Jabbari

[11] Patent Number: 5,557,490
[45] Date of Patent: Sep. 17, 1996

[54] METHOD OF MANUFACTURING AN ACTUATOR ARM WITH A STEEL SLEEVE FOR THERMAL OFF TRACK COMPENSATION

[75] Inventor: Iraj Jabbari, San Jose, Calif.

[73] Assignee: Seagate Technology, Inc., Scotts Valley, Calif.

[21] Appl. No.: 279,679

[22] Filed: Jul. 25, 1994

Related U.S. Application Data

[63] Continuation of Ser. No. 970,769, Nov. 3, 1992, abandoned, which is a continuation of Ser. No. 611,300, Nov. 9, 1990, Pat. No. 5,161,077.

[51] Int. Cl.$^6$ .............................. G11B 5/55; B22D 19/00; H02K 23/26
[52] U.S. Cl. ................... 360/106; 29/33 C; 29/DIG. 10; 29/DIG. 23; 164/98
[58] Field of Search .............................. 360/98.01, 98.08, 360/99.01, 99.08, 104–106; 310/15, 29; 29/603, 557, DIG. 2, DIG. 5, DIG. 10, DIG. 23, DIG. 28; 164/98

[56] References Cited

U.S. PATENT DOCUMENTS

| 4,667,779 | 5/1987 | Lang | 188/71.2 |
|---|---|---|---|
| 4,676,064 | 6/1987 | Narita et al. | 164/98 |
| 4,700,444 | 10/1987 | Yamagata | 164/98 |
| 4,701,653 | 10/1987 | Merkle et al. | 360/99.08 |
| 4,705,092 | 11/1987 | Ito et al. | 164/98 |
| 4,715,178 | 12/1987 | Tsukuda et al. | 164/98 |
| 4,717,977 | 1/1988 | Brown | 360/98.08 |
| 4,754,353 | 6/1988 | Levy | 360/106 |
| 4,757,406 | 7/1988 | Stewart et al. | 360/51 |
| 4,949,000 | 8/1990 | Petersen | 310/179 |
| 4,978,233 | 12/1990 | Stotzel et al. | 384/42 |
| 4,994,931 | 2/1991 | Foote | 360/104 |
| 5,034,837 | 7/1991 | Schmitz | 360/106 |
| 5,052,463 | 10/1991 | Lechner et al. | 164/98 |
| 5,099,374 | 3/1992 | Ohkita et al. | 360/106 |
| 5,251,085 | 10/1993 | Morris et al. | 360/106 |
| 5,260,847 | 11/1993 | Basehore et al. | 360/106 |

Primary Examiner—Stuart S. Levy
Assistant Examiner—Jefferson Evans
Attorney, Agent, or Firm—Flehr, Hohbach, Test, Albritton & Herbert

[57] ABSTRACT

The present invention is an apparatus and method for an improved actuator arm assembly in a disc drive. The improvement arises by casting a steel sleeve into the actuator arm to define a pivot bore. A steel bearing and shaft assembly cooperates with the pivot bore to enable the actuator arm to rotate about the shaft. This all steel arrangement minimizes the bearing preload necessary to create a stable actuator arm assembly having a minimum amount of friction in the bearing system.

11 Claims, 2 Drawing Sheets 5,557,490

METHOD OF MANUFACTURING AN ACTUATOR ARM WITH A STEEL SLEEVE FOR THERMAL OFF TRACK COMPENSATION

This is a continuation of application Ser. No. 07/970,769 filed on Nov. 3, 1992, abandoned; which is a continuation of application Ser. No. 07/611,300 filed on Nov. 9, 1990, now U.S. Pat. No. 5,161,077.

The present invention relates generally to disc drive systems and particularly to methods and apparatus for an improved disc drive actuator arm assembly.

BACKGROUND OF THE INVENTION

In general, a disc drive contains one or more discs capable of magnetically storing information. The information is read and written to specific locations on the disc or discs using magnetic transducers, commonly known as heads, that "fly" above the disc surface. Head positioning apparatus is provided in the form of an actuator arm assembly.

The actuator arm assembly consists of a substantially triangularly shaped actuator arm. Traditionally the arm is constructed from a low mass material such as cast aluminum. The arm is designed to pivot about a centrally located pivot bore. The bore cooperates with a bearing system surrounding a fixed shaft enabling the arm to pivot smoothly about the shaft.

At one end of the arm is attached a means for moving the arm about the shaft. Typically, the motion is accomplished by a moving coil magnetic motor having the motor coil attached to the arm. Activating the motor coil causes the actuator arm to pivot about the shaft.

Attached at the other end of the arm are transducers for receiving and depositing information from/to the discs. The transducers are commonly known as read/write heads. The electrical signals received by the heads are transmitted via flexible cabling to a signal processing circuitry located elsewhere in the disc drive.

To ensure accurate alignment of the heads over desired positions on the discs, the arm must be physically stable during all suspected disc drive operating conditions. The main concern is that the bearing system be stable and have minimum friction over a large operating temperature range. To reduce arm tilt relative to the longitudinal axis of the shaft at a nominal temperature, the bearings are preloaded. However, preloading increases the friction in the bearing system. Additionally, as the temperature varies about the nominal value the bearing system and shaft expands and contracts relative to the aluminum arm causing fluctuations in the bearing preload force which results in fluctuations in the actuator arm tilt. To limit the tilt over all temperature ranges, the bearing preload is increased which also increases the friction.

In small disc drives, there is not enough space along the shaft to allow a spring to be used to supply the preload. Instead, a dead weight technique is used. This technique uses the spring weight of the bearing structure itself to provide the preload force. A preload of 600 grams may be necessary to accomplish the minimized tilt objective and compensate for preload fluctuations due to thermal cycling. This stability comes at the price of increased friction which leads to an increased size and power motor to overcome the friction and move the actuator arm. Increased friction also reduces the life of the bearing system.

An object of the present invention is to provide an actuator arm which requires less preloading force, but provides the same amount of physical stability over a large temperature range as the prior designs of actuator arm assemblies. Additionally, a reduced preload will increase the life of the bearing system.

SUMMARY OF THE INVENTION

In summary, the present invention is an improved actuator arm assembly. The improvement arises by incorporating a steel sleeve into the actuator arm to define a pivot bore. A stationary steel shaft and bearing system are provided to cooperate with said pivot bore and enable the actuator arm to rotate about the shaft. This creates a steel shaft to steel bearing to steel sleeve arrangement which is stable during thermal cycling. Thus, once the preload is established it will remain effective because all of the components to accomplish the pivot action will expand and contract at the same rate. The aluminum actuator arm is isolated from the bearing system and has no effect upon the preload during thermal cycling. Therefore, the bearing preload no longer has to be excessive to compensate for potential thermally induced variations in the components of the actuator arm assembly.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
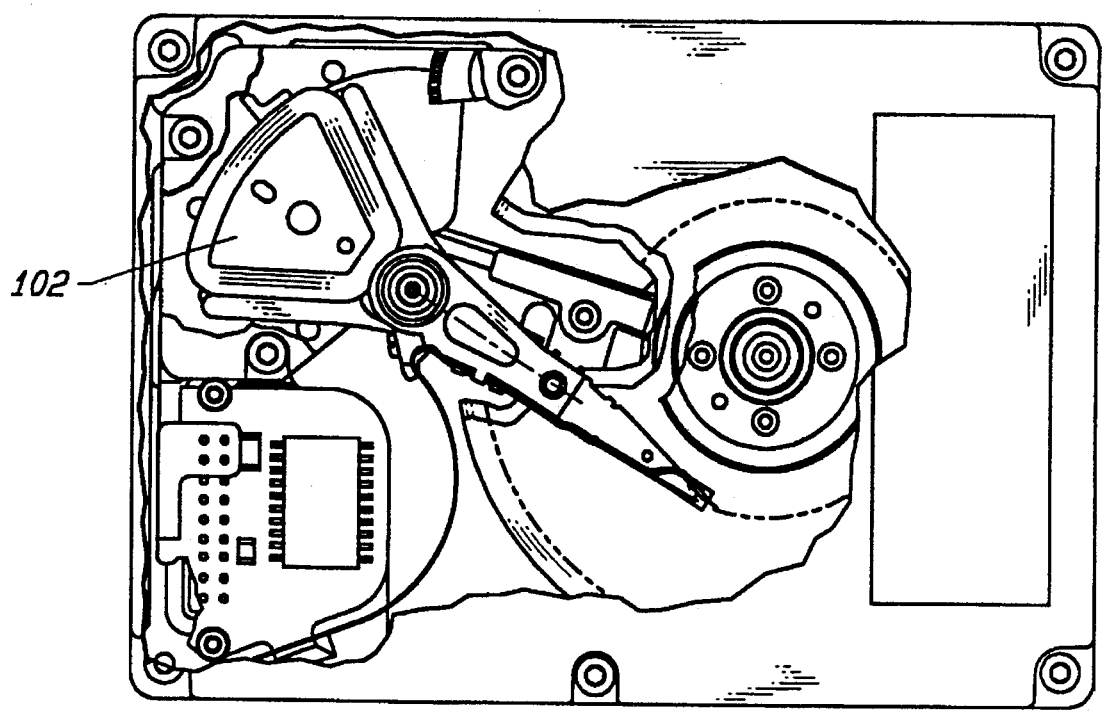
FIG 1 is a cut-away view of an entire disc drive incorporating the preferred embodiment of the invention.

Referring to FIG. 1, there is shown a cut-away planar view of a disc drive 100. Therein can be seen an actuator arm assembly 102 of the present invention. Essentially, the depicted drive includes the same basic components and operates in the same manner as was previously described in the foregoing BACKGROUND section. However, providing an actuator arm with a steel sleeve according to the present invention creates a much improved actuator arm assembly 102.

Figure 2:
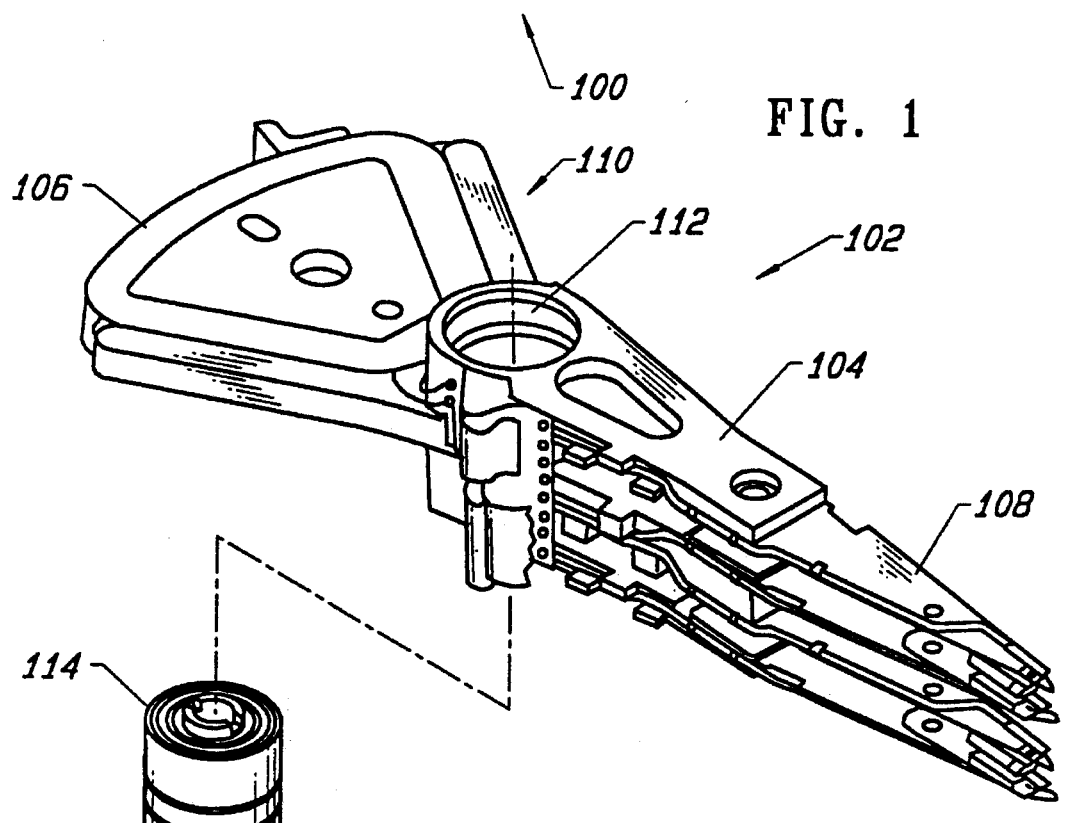
FIG. 2 is an partially exploded isometric view of the actuator arm assembly of the disc drive depicted in FIG. 1.

FIG. 2 shows a partially exploded perspective view of the actuator arm assembly 102. Therein is depicted a substantially triangular actuator arm 104, a voice coil 106 for a magnetic motor, transducer means 108, and a pivot bore 110. The pivot bore 110 is defined by a steel sleeve 112. A bearing system and shaft assembly 114 is attached to the steel sleeve 112 to provide a means by which the actuator arm 104 pivots about a fixed shaft 116.

Figure 3:
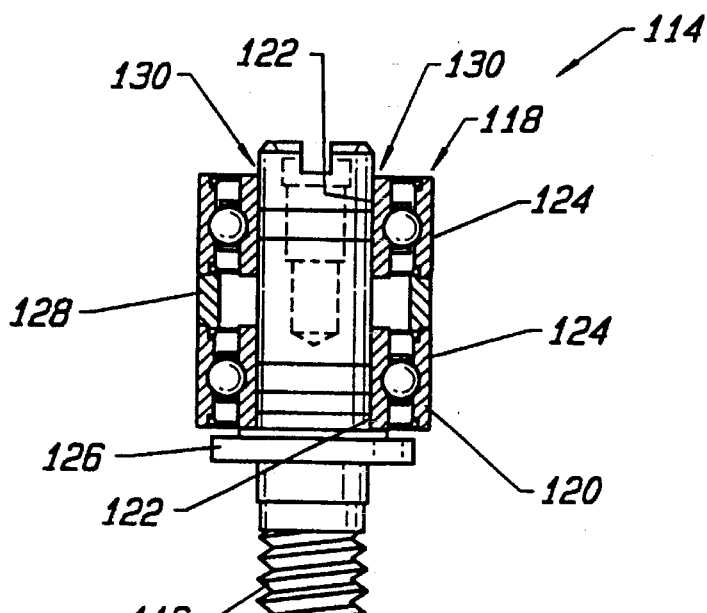
FIG. 3 is a sectional view of a bearing system and shaft assembly used in the disc drive of FIG. 1.

FIG. 3 shows a sectional view of the bearing system and shaft assembly 114. Two sets of bearings, an upper 118 and lower 120, are used to enable the actuator arm 104 to smoothly rotate about the shaft 116. The inner race 122 of each bearing set 118 and 120 is fixedly attached to the shaft 116, while the outer races 124 are fixedly attached to the steel sleeve 112 (FIG. 2). Attachment of the surfaces is usually accomplished by adhesive.

The bearing system and shaft assembly 114 is manufactured by applying adhesive to the inner race 122 of the lower bearing set 120 and sliding it onto the shaft 116 until it seats against a ledge 126. A spacer 128 is placed on top of lower bearing set 120. The inner race 122 of the upper bearing set 118 is epoxied into place above the spacer 128. Before the epoxy sets, the preload force 130 is applied to the upper bearing. The force will be maintained once the epoxy solidifies. In the present assembly, the preload is established by applying approximately 225 grams of force to the upper bearing set 118. However, the force required is determined by the application and component characteristics and should not be construed to be limited to approximately 225 grams.

Figures 4A, 4B:
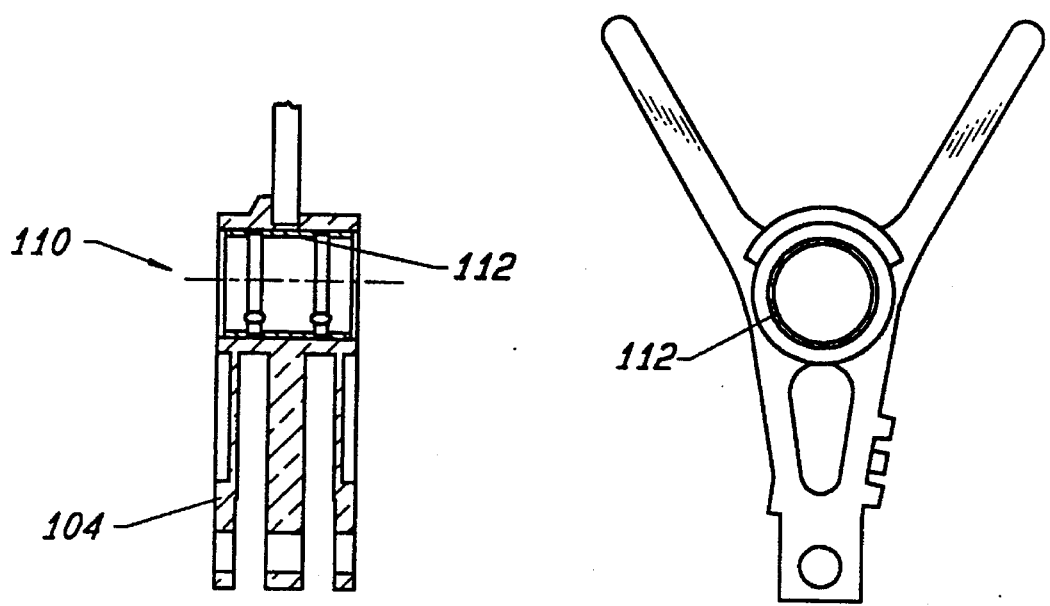
FIG. 4A is a planar view of an actuator arm incorporating the preferred embodiment of the invention.
FIG. 4B is a sectional view of FIG. 4A.

FIG. 4A depicts the actuator arm 104 having the steel sleeve 112. FIG. 4B depicts the actuator arm 104 of FIG. 4A in a cross sectional view along line 110 to better illustrate the steel sleeve as it defines the pivot bore 110. To effectuate a strong bond between steel sleeve 112 and actuator arm 104, steel sleeve 112 is cast into actuator arm 104. In other words, during casting of the actuator arm the steel sleeve 112 is inserted into the casting die and the arm is cast around it. Thus, a strong bond between the outer surface of steel sleeve 112 and the actuator arm 104 is established. This bond is enhanced when the outer surface of steel sleeve 112 is knurled.

The bearing system and shaft assembly 114 (FIG. 3) is inserted into steel sleeve 112. The inner surface of steel sleeve 112 is adhesively attached to the outer races 124 of bearing sets 118 and 120 by inserting epoxy into grooves 121. Thus, actuator arm 104 will smoothly rotate about fixed shaft 116 using a totally steel bearing/shaft/pivot bore arrangement.

The foregoing assembly results in an actuator arm assembly having a bearing system with a very small required preload and operating over a −40 degrees C. to +70 degrees C. temperature range without thermally generated instability in the pivot. In this instance a preload of only 225 grams is used. The light preload has many advantages, including lower bearing friction, smaller actuator motors and longer bearing life. The arrangement mitigates the thermal expansion problems resulting from having an aluminum arm interfacing directly with the bearing system. Due to the all steel design, the current invention ensures that the preload will remain substantially constant during temperature cycling.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method of manufacturing an actuator arm of a first material different from steel used for pivotal rotation about a steel shaft and a steel bearing system, wherein said steel bearing system includes a race retaining a bearing unit, an inner surface of said race being fixably attached to said steel shaft, and an outer surface of said race being rotatable about said steel shaft, the method comprising the following steps:

(a) providing a casting die having a desired shape of said actuator arm;

(b) positioning a steel sleeve in said die at a location defining a desired actuator arm pivot bore, wherein said steel sleeve is sized to fit over said race and the outer surface of the steel sleeve is textured to facilitate the bonding of the steel sleeve to the actuator arm; and (c) forming said actuator arm such that said steel sleeve becomes an integral portion of said actuator arm.

2. The method of claim 1, wherein at said step (b), said steel sleeve has a thermal co-efficient substantially identical to a thermal co-efficient of said steel shaft and said steel bearing system.

3. The method of claim 1, wherein said steel bearing system includes upper and lower bearings captured by upper and lower races, and wherein inner surfaces of said upper and lower races are fixably attached to said steel shaft, and wherein outer surfaces of said upper and lower races are rotatable about said shaft.

4. The method of claim 1 wherein said first material is aluminum.

5. A method of manufacturing an actuator arm, of a first material different from steel, utilized for pivotal rotation about a steel shaft and in conjunction with a steel rotor sleeve, said actuator arm requiring a reduced preloading force without reducing resistance to fluctuations of temperature over an operational temperature range in a tilting of the actuator arm, the method comprising:

(a) providing a die having a desired shape of said actuator arm;

(b) positioning a steel rotor sleeve in said die at a location defining a desired actuator arm pivot core, wherein the outer surface of the steel rotor sleeve is textured to facilitate the bonding of the steel sleeve to the actuator arm; and (c) casting said actuator arm from said first material such that said steel rotor sleeve becomes an integral portion of said actuator arm.

6. The method of claim 5, wherein at said step (b), said steel rotor sleeve has a thermal co-efficient substantially identical to a thermal co-efficient of said steel shaft.

7. The method of claim 5 wherein said first material is aluminum.

8. A method of manufacturing and pre-loading an actuator arm formed from a material different from steel and used for pivotal rotation about a steel shaft and a bearing unit, wherein said steel shaft is fixedly attached to a hard disk drive unit frame, and wherein said bearing unit includes upper and lower bearings associated with upper and lower steel inner races fixably attached to said steel shaft, and includes upper and lower steel outer races rotatable about said steel shaft, the method comprising the following steps:

(a) providing a casting die having a desired shape of said actuator arm;

(b) positioning a steel sleeve in said die at a location defining a desired actuator arm pivot bore, said steel sleeve being sized to fit over said outer race and the outer surface of the steel sleeve is textured to facilitate the bonding of the steel sleeve to the actuator arm;

(c) forming said actuator arm such that said sleeve becomes an integral portion of said actuator arm;

(d) adhesively-attaching said lower steel inner race of said bearing unit to said steel shaft;

(e) epoxy-attaching said upper steel inner race of said upper bearing unit to said steel shaft; and (f) before and while epoxy associated with said step (e) sets, applying a pre-load to said upper bearing unit;

wherein said steps (a), (b) and (c) provide said actuator arm with improved thermal expansion as compared to an actuator arm with said steel sleeve, and wherein said step (f) minimizes actuator arm tilt without requiring permanent application of a pre-load force.

9. The method of claim 8, wherein at said step (b), said steel sleeve has a thermal co-efficient substantially identical to a thermal co-efficient of said steel shaft and said bearing unit.

10. The method of claim 8, including the further step (g) of adhesively attaching said upper and lower steel outer races to said inner surface of said steel sleeve.

11. A method as claimed in claim 8 wherein said different material is aluminum.

* * * * *